April 13, 1954  A. E. HEATHCOTE  2,675,030
METHOD OF AND A MACHINE FOR THE MANUFACTURE OF BARBED WIRE
Filed Nov. 29, 1948  4 Sheets-Sheet 1

Inventor,
Albert E. Heathcote,

By C. F. Wenderoth atty.

April 13, 1954     A. E. HEATHCOTE     2,675,030
METHOD OF AND A MACHINE FOR THE MANUFACTURE OF BARBED WIRE
Filed Nov. 29, 1948     4 Sheets-Sheet 2

Inventor,
Albert E. Heathcote,

By C. F. Wenderoth atty.

April 13, 1954   A. E. HEATHCOTE   2,675,030
METHOD OF AND A MACHINE FOR THE MANUFACTURE OF BARBED WIRE
Filed Nov. 29, 1948   4 Sheets-Sheet 3

Inventor;
Albert E. Heathcote

By C. F. Wenderoth atty.

April 13, 1954  A. E. HEATHCOTE  2,675,030
METHOD OF AND A MACHINE FOR THE MANUFACTURE OF BARBED WIRE
Filed Nov. 29, 1948  4 Sheets-Sheet 4
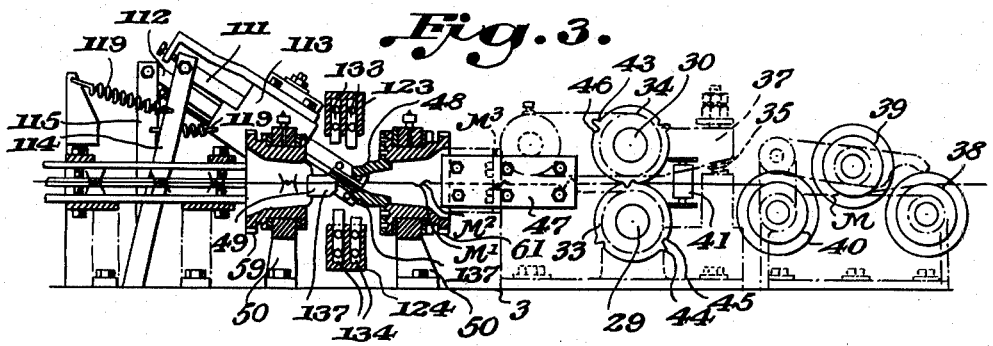
Fig. 3.
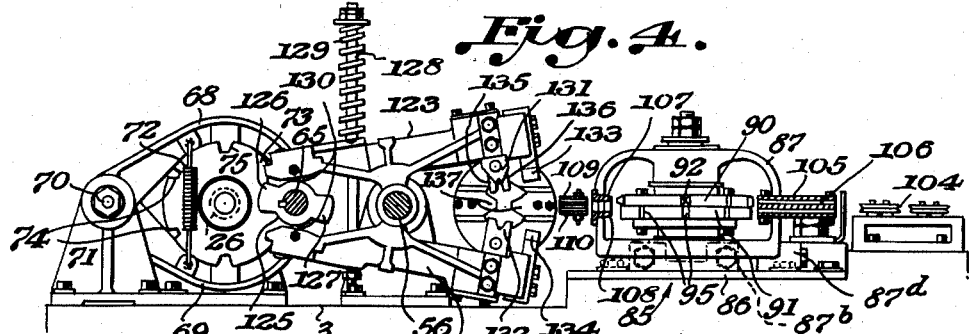
Fig. 4.
Fig. 8.   Fig. 9.
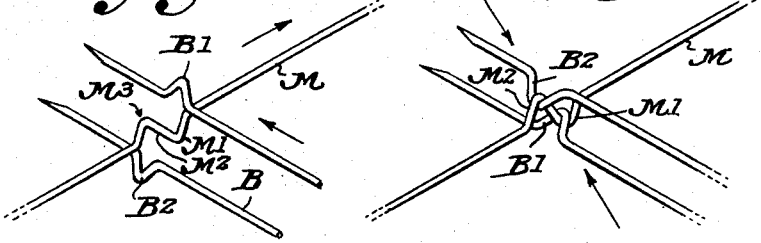
Fig. 10.
Fig. 11.
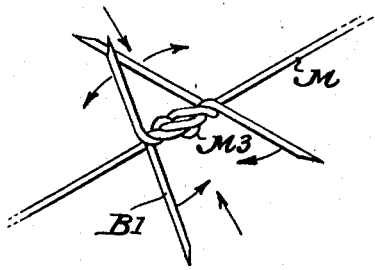
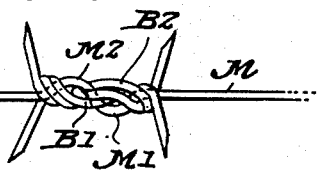
Inventor:
Albert E. Heathcote,
By C. F. Wenderoth  atty.

Patented Apr. 13, 1954

2,675,030

UNITED STATES PATENT OFFICE 2,675,030

METHOD OF AND A MACHINE FOR THE MANUFACTURE OF BARBED WIRE

Albert Ernest Heathcote, Essendon, Victoria, Australia, assignor to Barblok Inventions Proprietary Limited, a company of Victoria, Australia Application November 29, 1948, Serial No. 62,484

Claims priority, application Australia October 3, 1946

9 Claims. (Cl. 140—61)

This invention relates to the art of manufacturing barbed wire, and is directed to the general kind of barbed wire, the subject of Australian Patent No. 110,124.

In the specification of this patent there is described a single strand barbed wire and method of manufacturing the same, said wire broadly stated comprising sets of offset and adjacently opposed kinks disposed in spaced relationship along the single strand wire, the said kinks being adapted to receive and maintain in interlocked position barb forming wires twisted around the single strand wire and having their barbed end portions projecting outwardly in different directions to form a uniformly barbed wire.

Now the principal object of this invention is to provide an improved method for the effective, economical and continuous production of the barbed wire of the kind specified from rolls of wire of the requisite gauge and tensile strength.

In achieving this principal object and according to the invention, the method of manufacturing barbed wire, comprises the steps of intermittently traversing a kinked main strand, intermittently traversing at least one kinked barb forming strand to intersect the kinked main strand, engaging kinks of the barb forming strand with kinks of the main strand, severing the barb forming strand upon engagement of the former and latter kinks to form projecting barb lengths on opposite sides of the main strand, and twisting the barb lengths about the main strand to form projecting barbs.

A further and important object of the invention is to provide an efficient machine for the manufacture of such barbed wire in a continuous and automatic operation whereby a single operative only is required to supervise the machine or bank of the latter.

With this further object in view, there is provided according to this invention a machine for the purpose stated, comprising means for intermittently and axially traversing a kinked main strand, coacting means operating in timed relation for intermittently feeding at least one kinked barb forming strand into intersecting relation with the main strand for the engagement of a kink on the former strand with a kink on the latter strand, and intermittently operable instrumentalities cooperating in timed relation to interengage the kinks, sever the barb strand to form projecting barb lengths on opposite sides of the main strand and twist the severed barb lengths about the main strand to form projecting barbs.

In operation the intermittently advancing main strand is formed with a substantially V-shaped double kink which is stopped in alignment with the correspondingly feeding barb forming wires which intersect at right angles the path of travel of the main strand.

The barb forming wires each have a single substantially V-shaped kink, and the kink of one wire projects over and the kink of the other under the kink strand.

In this position the kinked portions of the barb wires are guided into engagement with the kink in the main strand, and with the latter and said wires temporarily stationary, the instrumentalities are actuated to respectively clamp the interengaged kinks for that position, sever the barb wires on the bias, and then twist the free ends, four in all, several turns about the main strand to form the barbs. The free ends on one barb forming wire are twisted in an opposite direction relatively to the other wire to interlock the interengaged kinks and to eliminate twisting of the main strand during the twisting operation.

The invention will be better understood from the following description of the practical arrangement of a barbed wire making machine illustrated in the accompanying drawings.

In these drawings—

Fig. 3 is a longitudinal section somewhat diagrammatical on the line III—III of Fig. 2.

Fig. 4 is a transverse section, somewhat diagrammatical, and partly in elevation on the line IV—IV of Fig. 2.

Figs. 8 and 9 and 10 are diagrammatical views showing the successive steps in engaging single kinked barb strands with a double kinked main strand and pointing and twisting the former about the latter.

Fig. 11 is a side elevation of a completed barbed section.

Figure 1:
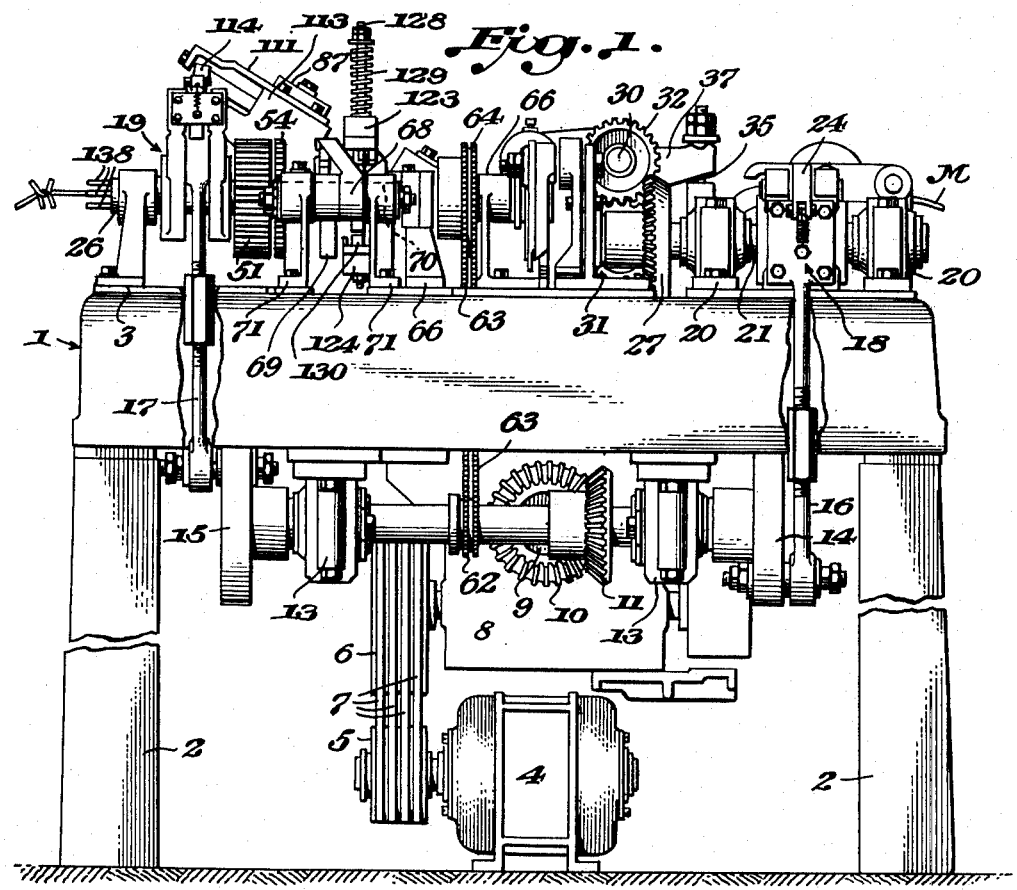
Fig. 1 is a side elevation of the machine.
Figure 2:
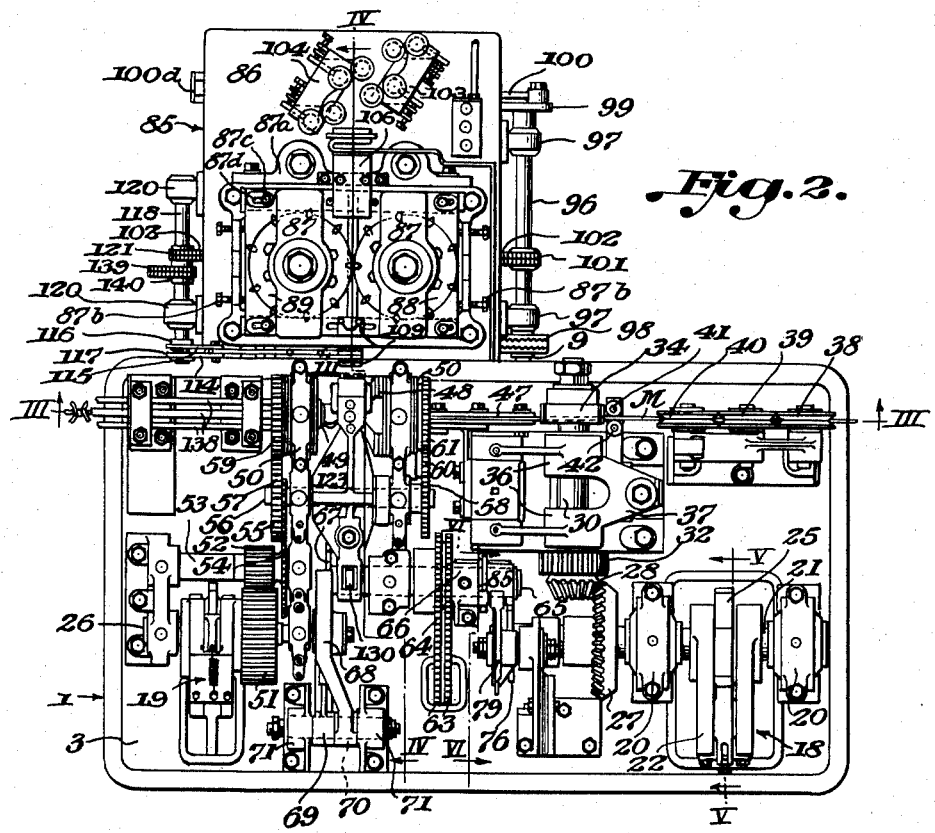
Fig. 2 is a plan view of the machine.

Referring to the drawings, and more especially to Figs. 1 and 2, the numeral 1 designates the main frame having upright supports or legs 2, and a flat top or table 3 beneath which is positioned an electric motor 4 of required capacity which is drive connected by pulleys 5 and 6 and belts 7 with a speed reducer or reduction gear box 8.

The output shaft 9 of the speed reducer 8 is extended outwardly on opposite sides of the latter, and as shown by Fig. 1, carries at one end a bevel gear 10 which is secured to the output shaft 9 and meshed with a bevel gear 11 fixed to a shaft 12 rotatably supported by bearings 13 mounted on the frame 1.

The shaft 12, which for convenience may be termed "the main shaft," is rotated at a reduced speed relatively to the electric motor 4 and suitable for the operation of the several units hereinafter fully described, whereby the main or longitudinal wire strand is formed at spaced intervals for the reception of the wires or strands to form the barbs and the latter are engaged with and secured to the main or longitudinal strand.

Upon the opposite ends of the main shaft 12 are secured cranks 14—15, which by connecting rods 16—17 are operatively connected respectively to angularly reciprocable pawl and ratchet means 18 and 19.

As the pawl and ratchet means 18 and 19 are similar in construction, a description of the former means whereby the mechanism presently described for crimping and feeding the main strand, indicated by M, is operated will suffice for both.

Figures 5, 14:
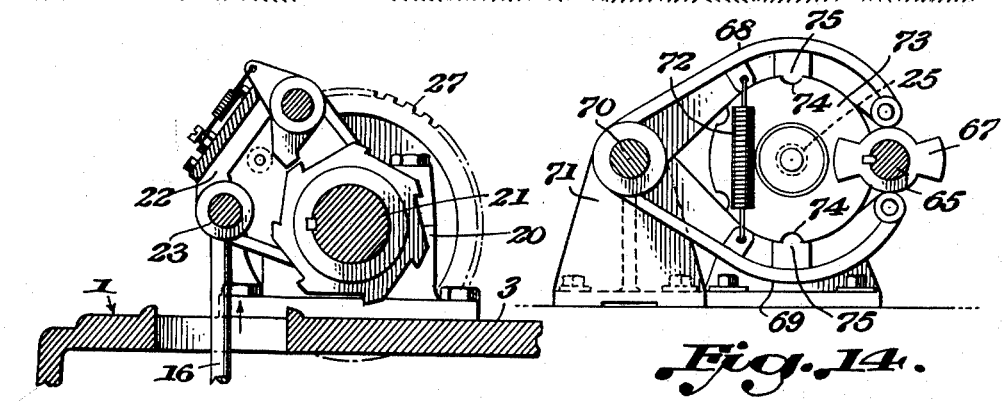
Fig. 5 is a sectional detail on a larger scale taken on the line V—V of Fig. 2.
Fig. 14 is an elevational view of a detail.

Rotatably supported by bearings 20 secured to the table 3 is a shaft 21, whereon are pivotally mounted spaced arms 22 between which extends a pin 23 connected to the upper end of the connecting rod 16, see Fig. 5.

The spaced arms 22 carry a spring-influenced pawl 24 coactive with a ratchet disc 25 positioned between the spaced arms and secured to the shaft 21.

It will be apparent that upon rotation of the main shaft 12, the crank 14 will reciprocate the connecting rod 16 and that the latter will rock the arms 22 about the ratchet shaft 21. Accordingly, the pawl 24 will be alternately idly traversed over and operatively connected with the ratchet 25, to thereby intermittently partially rotate the ratchet shaft 21 through a constant angular displacement.

In the same manner, the ratchet shaft 26 of the pawl and ratchet means 19 will be intermittently rotated through a constant angular displacement by the crank 15 and connecting rod 17.

The connecting rods 16 and 17 are constructed in upper and lower adjustably connected sections, so as to enable the pawl carrying arms to be adjusted to effect the correct setting of the pawls relatively to the respective ratchet discs.

Secured to the ratchet shaft 21 is a bevel gear 27 which is meshed with a bevel gear 28 on a lower shaft 29, see Fig. 3, operatively connected with an upper and parallel shaft 30 by spur gears 31—32.

To the shafts 29 and 30 there are secured a pair of complementary feeding and crimping rolls 33 and 34 which are maintained in resilient contact with each other by a spring 35 operatively connected to the bearings 36 of the shaft 30 carrying the upper crimping roll 34. The bearings 36 are carried by a pivoted arm 37, and is accordingly capable of movement so that the shaft 30 and the roll 34 may move relatively to the shaft 29 and roll 33 against the resistance of the spring 35.

The intermittent angular displacements of the ratchet shaft 21 are transmitted by the bevel gears 27—28 and spur gears 31—32 to the crimping rolls 33—34, and the speed ratio of said gears is such that each angular displacement of the ratchet shaft 21 rotates the crimping rolls through one-third of a revolution, there being three evenly spaced forming teeth in each roll as illustrated. Two or more than three forming teeth may be provided in the crimping rolls 33—34 if required, the speed ratio of the gears being correspondingly proportioned.

The main strand M is drawn intermittently by the gripping action of the crimping rolls from a reel (not shown) of wire of suitable gauge and material, preferably high tensile steel, and upon entering the machine at the right hand end, as shown in Fig. 1, passes through grooved tensioning rolls 38, 39 and 40, whereby the strand is straightened and tensioned.

Upon leaving the tensioning rolls, the main strand M passes through guide rolls 41—42, whereby the strand is guided between the crimping rolls 33—34.

The crimping rolls have forming teeth 43—44 of rounded or radiused profile and complementary recesses 45—46, see Fig. 3, which cooperate with the teeth to form approximately V-shaped oppositely disposed kinks M1—M2 in the main strand or line M.

The pitch line radius of the teeth 43 and 44 and the circular pitch or circumferential distance between the teeth determine the spacing of the pairs of kinks or double kinks in the main strand. These factors may be selected so as to form the double kinks M3 at spaced intervals of four inches apart, but they may be varied so that the kinks are made at less or greater distance than four inch spacing, if required.

It will be understood that the main strand M in passing between the crimping rolls displaces the upper roll 34 in opposition to the spring 35 which reacts to maintain the crimping rolls in close contact with the strand M, so that the latter passes between said rolls without slip and conforms with the contours of the forming teeth 43—44 and the complementary recesses 45—46.

The main strand M is fed forwardly by the feeding and kinking rolls 33 and 34 and the double kinks M3 upon leaving these rolls are advanced intermittently and pass successively through a guide 47 which maintains the double kinks in upright position and centralizes the strand in relation to a pair of spaced coaxially aligned barb twisting members or spinners 48—49 hereinafter fully described.

Figure 7:
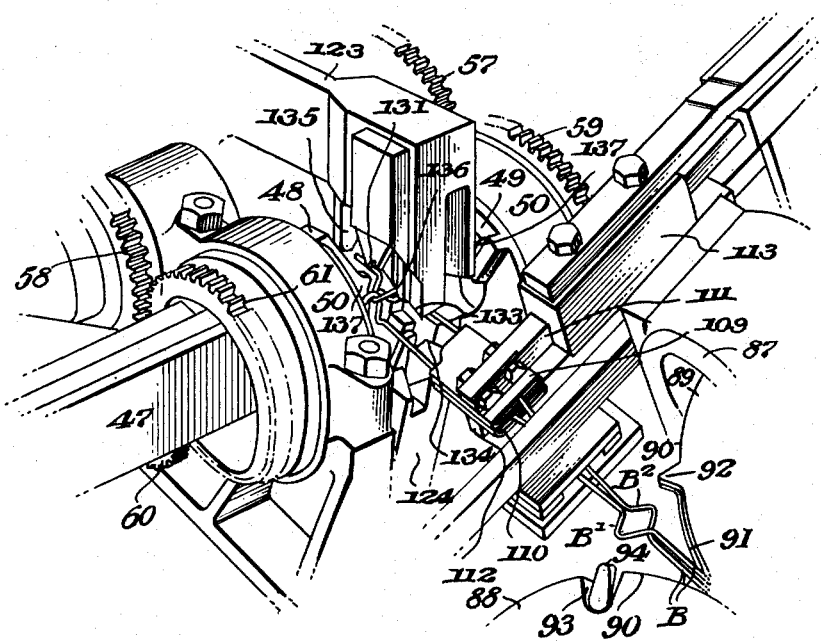
Fig. 7 is a perspective view of the mechanism whereby barb strands are engaged with a main strand and cut and twisted about the latter to form barbed wire.

The main strand M is thrust intermittently by the crimping rolls 33—34 through the guide 47 and spinners 48—49, and at the termination of each feed movement or advance of the strand M, a double kink M3 is positioned between the spinners and is temporarily maintained at rest for engagement by the barb strands B, see Figs. 2, 4 and 7, and twisting thereon of said barb strands by the spinners 48—49 to form babs as presently explained.

The spinners 48 and 49 are rotatably supported in bearings 50 secured to the table 3, and are intermittently rotated in opposite directions through a required number of revolutions, preferably 1½ turns, by the ratchet shaft 26 previously described.

For the purpose of thus rotating the spinners there is secured to the ratchet shaft 26 a gear 51 which is meshed with a gear 52 rotatably mounted on a fixed shaft 53 secured in supports fixed to the table 3. Integral with the gear 52 is a gear 54 which is meshed with a gear 55 fixed to a shaft 56 rotatably supported in bearings secured to the table 3.

To the shaft 56 there are secured gears 57 and 58 of which the gear 57 is meshed with a gear 59 secured to and coaxial with the spinner 49, while the gear 58 through an idler gear 60 is drive connected with a gear 61 secured to and coaxial with the spinner 48.

It will be noticed that the gears 51—52 and 54—55 are constructed so as to augment or speed up the rotation of the shaft 56 relatively to each intermittent partial rotation or angular displacement of the ratchet shaft 26.

The mating gears 57 and 59 are equal, i. e. each gear has teeth of the same pitch and number. Moreover the gears 58 and 61 are equal but are interconnected by the idler gear 60. Accordingly, upon the shaft 56 being rotated through a required number of revolutions by the ratchet shaft 26 through the gears 51—52 and 54—55, the spinners 48 and 49 will be rotated at the same speed and through the same number of revolutions, but the spinner 48 will be rotated oppositely to the spinner 49 by the reversing action of the idler gear 60.

The pawl and ratchet means 18 and 19 are so arranged and their actions are so timed that the intermittent advance or feed movements of the main strand M occur during the periods of repose of the spinners 48—49, while the rotary movements of the latter take place in the periodic intervals during which the main strand M is stationary.

As previously stated at each feed advance of the main strand M, a double kink M3 is positioned between the spinners 48 and 49 and maintained stationary for the connection of barb strands B1—B2 to form barbs.

It is accordingly necessary to secure the spinners 48 and 49 against movement during the feed advance of the main strand M and until lengths to form barbs have been connected with the stationary double kink M3, severed from the barb supply lines and clamped to the double kink for twisting about the main strand M by the spinners 48 and 49 as hereinafter described.

It is also necessary to secure the main strand against movement upon a double kink M3 being located between the spinners and until the completion of the barb connecting and forming operations.

The means for locking the spinners 48 and 49 against movement will now be described, reference being made to Figs. 1, 2 and 4.

Secured to the main shaft 12 is a sprocket 62 which is drive-connected by a chain 63 with a sprocket 64 secured to a cam shaft 65 rotatably mounted in bearings 66 fixed to the table 3 and carrying a cam 67 adapted to engage the ends of opposed arms 68 and 69 to displace said arms in opposite directions at predetermined times for a purpose that will presently appear.

The arms 68 and 69 are pivotally supported upon a shaft 70 carried by brackets 71 secured to the table 3, and said arms are urged each towards the other by a spring 72, see Fig. 4.

Secured to the end of the ratchet shaft 26 is a stop plate 73 having formed inwardly from the periphery slots or notches 74 which are spaced at equal distances apart and disposed in diametrically opposite positions.

Formed upon the inner sides of the opposed arms 68—69 are teeth or detents 75 which are so located that upon release of the arms 68—69 by the cam 67 and under the influence of the spring 72, said detents engage a pair of oppositely positioned slots 74, thereby locking the plate 75 and the shaft 26 against rotation.

Accordingly it will be understood that the gear trains connecting the gear 51 secured to the shaft 26, with the spinners 48—49, will be locked against movement, so that the latter will also be secured against rotation.

Shortly before the commencement of the spinning or barb twisting operation, the cam 67 separates the arms 68—69 so as to withdraw the detents 75 from the notches 74, thereby setting free the shaft 26, the gear trains operatively connected with the gear 51 and the spinners 48—49 which immediately thereafter are actuated by the pawl mechanism 19 to effect the spinning operation.

The cam 67 maintains the arms 68—69 separated from the periphery of the stop plate 73 during the spinning operation, but releases the arms shortly before the arrival of the succeeding pair of notches 74 at the engaging position. Upon engagement of the detents with the succeeding notches the spinners 48—49 are relocked against movement.

The means for preventing feed movement of the feeding and crimping rolls 33—34 when a double kink M3 is positioned between the spinners 48—49 for the connection of barb lengths and the formation of barbs will now be described, attention being directed to Figs. 1 and 2, and to Fig. 6 particularly.

Secured to the ratchet shaft 21 is a stop plate 76 in the periphery of which is formed a required number of evenly spaced slots or notches 77 with which is engageable a tooth or detent 78 formed on a rocking lever 79.

Mounted upon a bracket 80 fixed to the table 3 is a plate 81 in which is secured a pin 82 whereon the rocking lever 79 is pivotally supported and which is angularly adjustable about the shaft 21 to adjust the position of the rocking lever 79.

A spring 83 connected to the lever 79 effects engagement of the detent 78 with the notches 77, while a cam member 84 on the cam shaft 65 operatively engages and actuates the lever 79 so as to withdraw the detent 78 from the notch 77 with which the former is engaged.

Immediately upon arrival of a double kink M3 at the barb connecting position between the spinners 48—49 under the operative action of the pawl and ratchet means 18, the detent 78 becomes engaged with one of the notches 77, whereby securing the stop plate 76 against rotation and through the bevel gears 27—28 and spur gears 31—32 locking the feeding and crimping rolls 33—34 so as to maintain the main strand M stationary.

At the termination of the barb attaching operations the cam 84 operates the rocking lever 79 to release the detent 78, whereupon the pawl and ratchet means 18 become effective to operate the rolls 33—34 to advance the main strand M and set the following double kink M3 in the barb attaching position.

Each double kink upon becoming stationary between the spinners 48—49 is located in the line of travel or in-feeding of the barb strands B which is transversely disposed or at right angles to the line of travel of the main strand M.

Each barb forming wire or strand B is provided with evenly spaced substantially V-shaped single kinks, indicated by B1—B2, and the kinks B1 of one wire are disposed in alignment with and in oppositely related positions to the kinks B2 on the other wire, so that the aligned kinks travel in pairs in the feeding of the barb strands.

The means whereby the barb strands B are drawn from reels (not shown), formed with kinks B1—B2 and in-fed to the main line for barb forming and connection with the double kinks M3 will now be described, with reference more particularly to Figs. 2, 4, 7 and 12.

The main frame 1 is provided with a lateral extension 85, see Fig. 2, comprising a support or table 86 which is shown in Figs. 2 and 4 as being horizontal for convenience of illustration, but is in practice inclined so as to dispose the rolls 88 and 89 in a sloping position to correspond with the inclination of the kinks M1—M2 to the main strand as shown in Fig. 7.

Figures 6, 12:
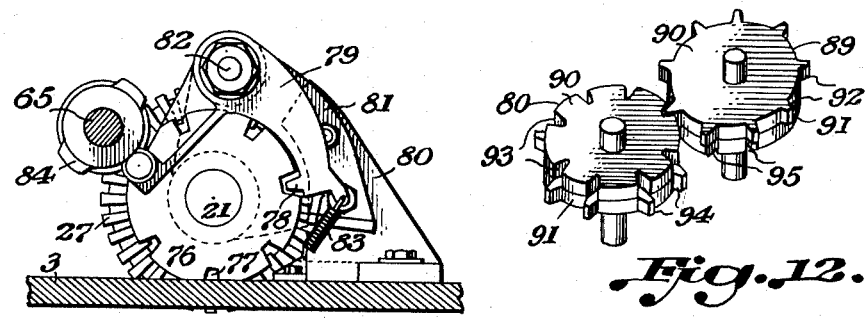
Fig. 6 is a sectional detail on a larger scale taken on the line VI—VI of Fig. 2.
Fig. 12 is a view in perspective of the barbed strand kinking and feeding rolls shown detached from the machine.

Upon the table 86 are supported frames 87 in which are rotatably mounted feeding and forming rolls 88 and 89, each of which is formed of upper and lower sections 90 and 91, the upper roll sections 90 being aligned to comprise a coacting pair of rolls while the lower roll sections are disposed in alignment to form another pair of coacting rolls, see particularly Fig. 12.

One of the upper coacting roll sections 90 is formed with projecting evenly spaced kink-forming teeth 92, while the coacting roll section 90 is formed with peripheral complementary kink-forming spaces or slots 93. The lower roll sections 91 are similarly formed with kink-forming teeth 94 and complementary kink-forming slots or spaces 95.

The frames 87 are relatively adjustable for the purpose of adjusting the clearance of the teeth 92 and 94 with complementary slots 93 and 95, and for this purpose said frames are slidably adjustable upon a sub-frame 87a secured to the table 86, said frames being adjustable by screws 87b in the sub-frame and secured in adjusted position by set screws 87c passing through slots 87d into threaded engagement with the sub-frame.

The four roll sections 90—91 are made of the same diameter and the teeth 92 and 94 and the complementary slots 93 and 95 have the same pitch or spacing. Moreover, the teeth 92 of the upper roll section 90 are positioned above and in alignment with the slots 95 in the contiguous lower roll section 91 while the teeth 94 of the lower roll section are located in alignment with the slots 93 in the contiguous upper roll section 90.

The complementary slots 93 and 95 are made of sufficiently greater size than the teeth 92 and 94 in order to provide the necessary clearance between said teeth and slots for the barb strands B in passing between the roll sections 90 and 91.

The feeding and forming rolls 88 and 89 comprised of the upper and lower roll sections 90 and 91 as above described, are intergeared to intermittently rotate at the same speed and in opposite directions and it will be understood that the teeth 92 and 94 mesh in sequence with the slots 93 and 95 as the roll sections 90 and 91 are rotated.

One of the two barb strands B is arranged to pass between the upper roll sections 90 while the other strand is passed between the lower roll sections 91, and it will be apparent that in passing between the teeth and complementary slots arranged as above described, the two strands will be formed with evenly spaced V-shaped kinks B1—B2 extending from the barb strands B in oppositely disposed relation.

For the purpose of actuating the barb strand kinking and feeding rolls 88—89 and other mechanism hereinafter described, there is provided a shaft 96 which is rotatably supported by bearings 97 secured to the extension 85 of the main frame 1, see Fig. 2.

The shaft 96 is located in coaxial alignment with the output shaft 9 of the speed reducer 8, and operatively connecting the shafts 9 and 96 in an adjustable vernier coupling 98 of well known construction whereby the shaft 96 may be angularly adjusted relatively to the output shaft 9.

On the end of the shaft 96 there is secured a crank 99 which by a connecting rod 100 actuates pawl and ratchet means 100a positioned beneath the table 86 and similar to the pawl and ratchet means 18 and 19 previously described herein.

The pawl and ratchet means 100a beneath the table 86 is operatively connected by appropriate gearing with the intergeared kinking and feeding rolls 88 and 89 and is adapted to intermittently partially rotate said rolls for the purpose of kinking and feeding the barb strands B.

Secured to the shaft 96 is a sprocket 101 which by a chain 102 drives continuously a countershaft rotatably mounted on the opposite side of the table 86 the purpose of which will be described hereinafter.

The rolls 88 and 89 periodically remain at rest, and said rolls are actuated by the pawl and ratchet means driven by the shaft 96, to intermittently impel the barb strands B through distances equivalent to the circumferential spaces between the successive teeth 92 and 94 on the upper and lower roll sections 90 and 91.

Each intermittent angular movement of the rolls 88 and 89 withdraws corresponding lengths of barb strands B from the supply reels (not shown).

The barb strands in moving from the supply reels to the rolls 88 and 89 pass through sets of straightening and tensioning rolls 103—104 to guides 105—106 whereby the barb strands are directed to the upper roll sections 90 and lower roll sections 91 respectively, see Fig. 4.

Upon leaving the roll sections the barb strands B now formed at intervals with the pairs of spaced kinks B1—B2 are advanced in stages by the intermittent angular movements of the roll sections and thrust between inclined guide plates 107—108, see particularly Fig. 7, whereby the strands are directed into inclined reciprocal guide members 109—110 of flattened tubular form, the purpose of which will appear presently. The inclination of the guide plates 107—108 and of the reciprocal guide members 109—110 is arranged to correspond with the angular disposition of the kinks M1—M2 relatively to the main strand M.

Upon passing through the tubular guide members 109—110 the barb strands are thrust transversely to the main strand M, one of the barb strands B1 being positioned above and the other B2 below the main strand, and both strands being extended for a required distance inwardly from the main strand M, see Fig. 8.

By appropriate adjustment of the vernier coupling 98 and setting of the pawl and ratchet means 100a associated with the feeding and forming rolls 88—89, the in-feeding of the barb strands to the main line or strand M is timed to occur immediately after a double kink M3 has become stationary between the spinners 48—49. Moreover, the in-feeding of the barb strands is arranged by appropriate adjustment to terminate upon a pair of oppositely disposed kinks B1—B2 becoming aligned with the double kink M3, the kink B1 being positioned for engagement with the kink M1 and the kink B2 being located for engagement with the kink M2, see Fig. 8.

Figure 13:
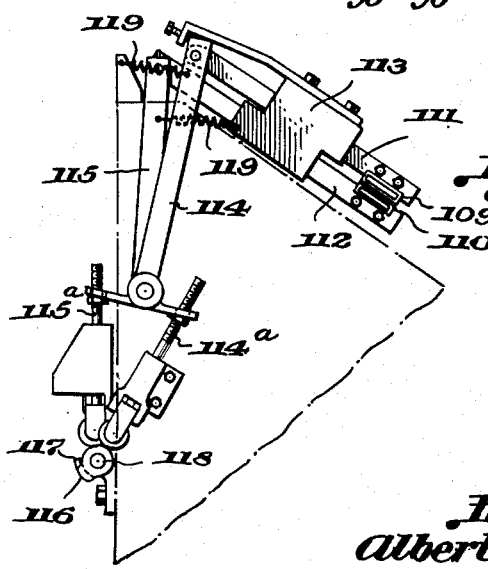
Fig. 13 is a side elevation of reciprocal guiding members for interengaging the kinks of the barbed and main strands and of actuating mechanism therefore.

The reciprocal tubular guide members 109—110 are carried by slide bars 111—112 slidably fitted in a fixed guide member 113 and operatively connected to oscillatable levers 114—115 actuated through push rods 114a—115a by cams 116—117 on the countershaft previously mentioned as actuated by the chain 102, against the resistance of springs 119, see Fig. 13. This countershaft indicated by 118, is rotatably supported by bearings 120 and is continuously rotated by a sprocket 121 fixed to said countershaft and driven by the chain 102 extending beneath the table extension 86 and driven by the shaft 96 as previously described herein.

The cams 116—117 are adapted by way of the levers 114—115 and slide bars 111—112 to separate or spread the reciprocal guide members 109—110 apart, i. e. in opposite directions away from the line of travel of the barb strands B, while the springs 119 upon release of the levers 114—115 move the reciprocal guide members reversely, i. e. towards the line of travel of the barb strands.

The cams 116—117 are timed to separate the barb strands B apart synchronously with the feeding of the latter transversely to the main strand M, so that the barb strands are thrust across and clear of the main M strand and the double kink M1 as shown in Fig. 8.

Upon the opposite kinks B1—B2 being aligned with the kinks M1—M2 as above described, the cams 116—117 release the guide members 109—110 which under influence of the springs 119 impel the kinks B1—B2 into engagement with the main strand kinks M1—M2, see Fig. 9.

Upon engagement of the kinks B1—B2 with the kinks M1—M2, the former and the latter are firmly clamped together, lengths to form barbs are severed from the barb strands and are twisted about the main strand M by the spinners 48—49 to form the projecting pointed barbs.

The means whereby these operations are performed will now be described, reference being made to Figs. 2, 4 and 7.

Pivotally supported upon the shaft 56 is a pair of coacting levers 123—124, see Fig. 4, which at one end contact with a cam member 125 having oppositely disposed cams 126—127 and secured to the cam shaft 65.

Passing through both levers is a rod 128 which through a spring 129 resiliently connects the levers and maintains rollers 130 carried by the levers in constant engagement with the cam member 125.

The cam shaft 65 is rotated at a constant speed as previously described, and the levers 123—124 are intermittently oscillated under the cooperative action of the cams 126—127 and the spring 129, there being a pause in the motion of the levers when the rollers 130 are in contact with the concentric portion of the cam member 125 as shown in Fig. 4, which is followed by a rapid movement of the levers as the cams engage and force the rollers 130 apart, this movement being succeeded by a dwell during which the levers are motionless as the concentric portions of the cams move past the rollers 130.

Upon the ends of the levers 123—124 remote from the rollers 130 there are secured complementary clamps 131—132 and coacting shear blades 133—134 which approach each other as the rollers 130 are engaged by the cams 126—127. The shear blades 133—134 are set obliquely or inclined to the line of travel of the barb strands so that in cutting the latter the lengths thereof to form the barbs are simultaneously pointed or sharpened.

The levers 123—124 are arranged to occupy the position, termed conveniently the "open position," shown in Fig. 4, during the feed movement of the main strand M and the positioning and locking of a double kink M3 between the spinners 48—49 and during the in-feeding of the barb strands and until the kinks B1—B2 of the latter are engaged with the main strand kinks M1—M2 as shown by Fig. 9.

Immediately upon the barb and main strand kinks being thus engaged, the levers are actuated by the cams to engage the clamps 131—132 with the assembled kinks as indicated by the arrows in Fig. 9.

Simultaneously, the shear blades 133—134 cooperate to cut off the lengths to form the barbs from the barb strands B. The barb lengths thus severed project from opposite sides of the main strand M, and continue to be firmly secured to the latter by the clamps 131—132.

Tapered spreaders 135—136, see Figs. 4 and 7, enter between the barb strands on opposite sides of the main strand and position the projecting barb ends for engagement by the spinners, during the relative approach of the ends of the levers 123—124 carrying the clamps 131—132.

With the engaged kinks M1—M2 and B1—B2 still held securely by the coacting clamps 131—132 and immediately after the severing by the shear blades 133—134 of the barb lengths, the locking arms 68—69 are released from the stop plate 73, thereby setting the spinners free for rotation by the pawl and ratchet means 19 which then operates to rotate the spinners 48 and 49 in opposite directions as previously described.

Twisting tools 137 carried by the spinners engage the projecting barb portions and wind the latter about the main strand M as indicated by the curved arrows in Fig. 10 which illustrates the winding of the barbs as partly completed, the finished barb section being shown by Fig. 11.

Upon the completion of the barb section, the spinners are re-locked against movement, the cams 126—127 disengage the rollers 130 whereupon the spring 129 returns the levers 123—124 to the open position.

The main strand M which during the barb connecting and finishing operations above described, has been retained stationary by the locking of the rolls 33—34, is then released by the disengagement of the rocking lever 79 from the stop plate 76 to set free the pawl and ratchet means 18 which operates to feed the next double kink M3 to the barb-applying position between the spinners 48—49, whereupon the cycle of operations is repeated.

The main strand M with the finished barbs connected to and wound thereon as described, passes through the interior of the spinner 49 and is delivered from the machine through guides 138 to be wound upon a reel (not shown) which is intermittently and synchronously rotated with the feeding and crimping rolls 33—34, so that the main strand M is subjected to a push-pull feed and is maintained under tension between the crimping rolls and the reel.

The reel (not shown), is operated by a friction clutch (not shown), one member of which is continuously rotated by a chain 139 drive-connected with a sprocket 140 secured to the cam shaft 118, while the coacting clutch member (not shown) is operatively connected with the reel and is intermittently engaged with the continuously rotating clutch member so as to be operated by the latter on synchronism with the crimping rolls 33—34.

A switch 141 of well known type is provided whereby the starting and stopping of the electric motor is controlled, and safety cut-outs are provided at required points, whereby upon contact therewith of a broken strand the circuit of the electric motor 4 is interrupted to stop the machine.

In the practical arrangement of a barbed wire making machine above described, a pair of kinked barb strands are used for the purpose of forming barbs on a main strand, but by appropriate modification a single kinked barb strand may be utilized for this purpose, if desired.

I claim:

1. A method of manufacturing barbed wire comprising a single wire having oppositely disposed continuous bends forming double kinks at spaced intervals apart and barbs interlocked with the double kinks, consisting in intermittently advancing the single wire longitudinally and forming therein a double kink at each advance, intermittently advancing a pair of wires to form the barbs to intersect the single wire and forming in the pair of wires during each advance thereof a pair of single kinks for connection with the double kinks and before engagement of the former and latter kinks, engaging a pair of single kinks with a double kink during each periodic rest of the single wire, clamping the single kinks in engagement with the double kink, shearing the pair of wires to form a pair of barb lengths in engagement with the respective bends of the double kink, and twisting the clamped barb lengths in opposite directions to interlock with the double kink and comprise projecting barbs.

2. A method of manufacturing barbed wire comprising a single wire having oppositely disposed continuous bends forming double kinks at spaced intervals apart and barbs interlocked with the double kinks, consisting in intermittently advancing the single wire longitudinally in a rectilinear course and forming therein a double kink at each advance, intermittently advancing in parallel relation a pair of wires to form the barbs to intersect the single wire and forming in the pair of wires during each advance a pair of aligned oppositely offset single kinks for connection with the double kinks and prior to engagement of the former kinks and latter kinks, engaging a pair of the offset single kinks respectively with the oppositely disposed bends of a double kink during each stationary period of the single wire, clamping the single kinks in engagement with said bends of the stationary double kink, shearing barb lengths including the clamped single kinks from the pair of wires, and twisting the clamped barb lengths in opposite directions to interlock with the double kink and comprise projecting barbs.

3. A machine for the manufacture of barbed wire comprising a single wire having oppositely disposed continuous bends forming double kinks at spaced intervals apart and barbs interlocked with the double kinks, said machine comprising in combination a table having a lateral offset extension, power motivated rotary drive means below the table, feed means on one side of the table for intermittently moving the single wire longitudinally over said table, feed means on the offset table extension for intermittently moving a pair of wires to form barbs from said extension and transversely across the table, forming means on the table for shaping the single wire with the double kinks, forming means on the table extension for shaping the pair of wires with aligned oppositely extending single kinks, connecting means for engaging the single kinks with the double kinks, clamping means for securing the single kinks in engagement with the double kinks, shearing means for cutting barb lengths including the clamped single kinks from the pair of wires, twisting means for engaging and winding the clamped barb lengths in opposite directions to interlock with the double kinks, and mechanisms on the side of the table remote from the feed means thereon actuated by the rotary drive means for operating in timed relation the feed means and the forming means on the table and the offset extension, the connecting means, the clamping means, the shearing means and the twisting means.

4. A machine for manufacturing barbed wire comprising a single wire having oppositely disposed continuous bends forming double kinks at spaced intervals apart and barbs interlocked with the double kinks, said machine comprising in combination a table having a lateral offset extension, drive means below the table, feeding means on the table operatively connectible with the drive means for impelling the single wire longitudinally over the table, feeding means on the table extension operatively connectible with the drive means for impelling a pair of wires from the table extension transversely over the table, shaping means on the table for forming the double kinks in the single wire, shaping means on the table extension for forming oppositely extending aligned pairs of single kinks in the pair of wires, connecting means for engaging the oppositely extending single kinks with the double kinks, clamping means for holding the single and double kinks in engagement, shearing means for cutting pointed barb lengths from the barb forming wires, said barb lengths including the single kinks clamped to the double kinks, twisting means engaging and winding the barb lengths in opposite directions to interlock with the double kinks and form projecting barbs, and mechanisms operable by the drive means for timing the intervals of operation of said wire feeding means, the wire shaping means, the connecting means, the clamping means, the shearing means and said twisting means.

5. A machine for manufacturing barbed wire comprising a single wire having oppositely disposed continuous bends forming double kinks at spaced intervals apart and barbs interlocked with the double kinks, said machine comprising in combination, a table having a lateral extension, power actuated drive means, a pair of intergeared feed rolls on the table operable by the drive means for impelling the single wire longitudinally over the table, pairs of intergeared feed rolls on the table extension operable by the drive means for impelling a pair of wires to form the barbs from the table extension transversely over the table, complementary shaping means on the pair of intergeared feed rolls coacting to form the double kinks on the single wire, complementary shaping means on the pairs of intergeared feed rolls coacting to form oppositely extending aligned pairs of single kinks in the pair of wires, guides for maintaining the pairs of wires in substantially parallel relation, reciprocable means for spreading the pairs of wires for alignment of the pairs of single kinks with the double kinks and operable to engage the former with the latter, clamping means for maintaining engagement of the single kinks with the double kinks, shearing means for cutting pointed barb lengths from the pair of wires, said barb lengths having centrally disposed therein the single kinks clamped to the double kinks, rotary twisting means engaging and winding the clamped barb lengths in opposite directions to interlock with the double kinks and form projecting barbs, and mechanisms periodically operable by the drive means for actuating the pair and pairs of intergeared feed rolls, the reciprocable means, the clamping means, the shearing means and the rotary twisting means in sequence and timed relation.

6. A machine for the manufacture of barbed wire comprising a single wire having oppositely disposed bends forming double kinks at spaced intervals apart and barbs interlocked with the double kinks, said machine comprising in combination a frame, a platform supported by the frame and having a lateral extension, power actuated means mounted on the frame below the platform, a pair of intergeared feeding and kinking rolls on one side of the platform intermittently operated by the power actuated means to form the double kinks in and simultaneously advance the single wire in steps longitudinally over the table, locking means operable to hold the intergeared rolls and the single wire stationary for a predetermined period at the termination of each advance with a double kink located at a barb connecting position, releasing means operated by the power actuated means for periodically releasing the locking means at the expiration of the period of repose of the intergeared rolls and the single wire, coacting pairs of intergeared feeding and kinking rolls on the lateral platform extension intermittently operated by the power actuated means during each period of repose of the single wire to form spaced pairs of single oppositely extending aligned kinks in a pair of wires to form barbs and simultaneously feed the pair of single kinked wires to intersect the single double kinked wire at the barb connecting position, guides for maintaining the pair of single kinked wires in parallel relation during the feeding movement, reciprocable means operable by the power actuated means for spreading the pair of single kinked wires in approaching the single wire and aligning and connecting a pair of single kinks in the former with the respective bends of a stationary double kink at the barb connecting position, clamping means operable by the power actuated means for holding the single kinks in engagement with the respective bends of the double kinks, shearing means operable by the power actuated means for cutting the pair of wires to form pointed barb lengths having centrally disposed therein the single kinks in clamped engagement with the stationary double kink, oppositely rotatable members on opposite sides of the barb connecting position intermittently rotated by the power actuated means to engage and wind the clamped barb lengths in opposite directions about the stationary double kink to interlock the former and latter and form projecting barbs, locking mechanisms holding the coating pairs of feeding and forming rolls and the twisting members stationary during the periodic advance movements of the single wire over the table, and means intermittently operated by the power actuated means for releasing the locking mechanisms at the termination of each advance of the single double kinked wire.

7. A machine for the manufacture of barbed wire comprising a single wire having oppositely disposed continuous bends forming double kinks at spaced intervals apart and barbs interlocked with the double kinks, said machine comprising feeding and kinking means for advancing the single wire and simultaneously forming a double kink therein, angularly reciprocable means drive connected with an operable to intermittently actuate the feeding and kinking means to advance the single wire through a predetermined distance and locate a double kink at a barb connecting position, releasable locking means for maintaining the feeding and kinking means and the single wire stationary at the end of each advance, releasing means for setting free the locking means at the end of each period of repose of the single wire, coacting pairs of feeding and kinking means operable during each rest period of the single wire to advance a pair of wires in parallel relation to form barbs to the barb connecting position and simultaneously form a pair of aligned oppositely extended single kinks in the pair of wires, reciprocable means for connecting a pair of the single kinks with the respective bends of the stationary double kink, angularly reciprocable members carrying clamps for holding the single kinks in engagement with the double kinks and shearing blades for cutting the pair of wires to form pointed barb lengths having centrally disposed therein the single kinks held by the clamps, oppositely rotatably twisting members disposed on opposite sides of the barb connecting position intermittently rotated to engage and wind the clamped barb lengths in opposite directions about the double kink to interlock the former and latter and form projecting barbs, releasable locking means for maintaining the rotatable twisting members stationary during each advance of the single wire and until the severing of the clamped barb lengths from the pair of wires, releasing means for setting free the locking means of the twisting members, and a continuously rotating cam shaft actuating the first and second mentioned releasing means and the angularly reciprocable members in timed relation.

8. A machine for the manufacture of barbed wire comprising a single wire having oppositely disposed continuous bends forming double kinks at spaced intervals apart and barbs interlocked with the double kinks, said machine comprising a pair of coacting feeding and kinking rolls intermittently rotated to advance the single wire and form a double kink therein at each advance, angularly reciprocable drive means for periodically rotating the feeding and kinking rolls, releasable locking means for holding the rolls stationary during each idle period and maintaining a double kink at a barb receiving position, pairs of coacting feeding and kinking rolls intermittently rotated to advance a pair of wires to form barbs to the barb receiving position and form a pair of single aligned oppositely offset single kinks in the pair of wires at each advance, means for connecting a pair of the single kinks with the stationary double kink at the barb receiving position, holding means for clamping the single kinks in engagement with the double kink, shearing means for cutting barb lengths from the pair of wires including the single kinks clamped to the stationary double kinks, oppositely rotatable twisting members disposed on opposite sides of the barb connecting position, angularly reciprocable drive means for periodically rotating the twisting members to engage and wind the clamped barb lengths about the double kink to interlock the former and latter and form projecting barbs, releasable locking means for holding the twisting members in normal stationary positions, and constantly rotating means actuating the clamping and shearing means and operable to release the locking means of the feeding and kinking rolls and the locking means of the oppositely rotatable twisting members alternately and in timed relation.

9. A machine for the manufacture of barbed wire comprising a single wire having oppositely disposed continuous bends forming double kinks at spaced intervals apart and barbs interlocked with the double kinks, said machine comprising in combination a table having a lateral offset extension, a power motivated drive shaft positioned below and transversely to the table, a main shaft geared with the drive shaft disposed below and longitudinally to the table, a pair of intergeared feeding and kinking rolls on one side of the table for feeding the single wire longitudinally over the table and forming the double kinks therein, angularly reciprocable drive means at the opposite side of the table actuated by the main shaft to intermittently rotate the feeding and kinking rolls to advance the single wire periodically and form a double kink therein at each advance, locking means for holding the feeding and kinking rolls stationary during each period of repose of the single wire, pairs of intergeared feeding and kinking rolls on the offset table extension operable by the drive shaft to periodically advance a pair of wires to form barbs transversely to the table and form a pair of aligned oppositely extending single kinks in the pair of wires at each advance, reciprocable members operable by the drive shaft for connecting a pair of single kinks with a stationary double kink during each period of repose of the single wire, a pair of coacting angularly reciprocable levers pivotally supported on a common axis and drive connected with the main shaft, coacting clamps carried on the reciprocable levers for clamping the pair of single kinks in engagement with the stationary double kink, coacting shearing blades carried on the reciprocable levers for cutting barb lengths including the clamped single kinks from the pair of wires, oppositely rotatable twisting members for engaging and winding the clamped barb lengths in opposite directions to interlock with the double kink and form projecting barbs, angularly reciprocable drive means at said opposite side of the table actuated by the main shaft to intermittently rotate the twisting members, locking means for holding the twisting members stationary during each advance of the single wire and engagement therewith of the barb lengths, and a continuously rotating cam shaft on the table driven by the main shaft and operable to reciprocate the coacting levers and release the locking means of the feeding and kinking rolls and the locking means of the rotatable twisting members alternately and in timed relation.

References Cited in the file of this patent

UNITED STATES PATENTS

| Number | Name | Date |
|---|---|---|
| Re. 10,597 | Sunderland | May 12, 1885 |
| 228,635 | Howe | June 8, 1880 |
| 232,819 | Henley | Oct. 5, 1880 |
| 242,706 | Sprague | June 7, 1881 |
| 291,903 | Hill | Jan. 15, 1884 |
| 325,733 | Connell | Sept. 8, 1885 |
| 330,686 | Edenborn | Nov. 17, 1885 |
| 519,633 | Kilmer | May 8, 1894 |
| 558,787 | Edenborn | Apr. 21, 1896 |
| 586,945 | Bates | July 20, 1897 |
| 902,152 | Kilmer | Oct. 27, 1908 |
| 988,197 | Lewis | Mar. 28, 1911 |
| 1,005,742 | Nullmeyer | Oct. 10, 1911 |
| 1,035,809 | Nullmeyer | Aug. 13, 1912 |
| 1,162,879 | Rauscher | Dec. 7, 1915 |
| 1,513,032 | Bull | Oct. 28, 1924 |
| 1,602,049 | Somers | Oct. 15, 1926 |
| 1,787,301 | Bailey | Dec. 20, 1930 |
| 1,799,236 | Hunt | Apr. 7, 1931 |
| 2,107,926 | Asmussen | Feb. 8, 1938 |
| 2,198,695 | Cummings | Apr. 30, 1940 |
| 2,203,068 | Thiemer | June 4, 1940 |
| 2,308,905 | Abbott | Jan. 19, 1943 |
| 2,330,611 | Nelson | Sept. 28, 1943 |

FOREIGN PATENTS

| Number | Country | Date |
|---|---|---|
| 129,991 | England | Apr. 1, 1920 |
| 330,164 | Germany | Dec. 10, 1920 |